United States Patent [19]

Matsumi et al.

[11] Patent Number: 5,257,141
[45] Date of Patent: Oct. 26, 1993

[54] METHOD OF RECORDING A DIGITAL VIDEO SIGNAL

[75] Inventors: Chiyoko Matsumi, Suita; Tatsuro Juri, Osaka, both of Japan

[73] Assignee: Matsushita Electric Industrial Co., Ltd., Osaka, Japan

[21] Appl. No.: 736,059

[22] Filed: Jul. 26, 1991

[30] Foreign Application Priority Data

Jul. 30, 1990 [JP] Japan .................................. 2-202127

[51] Int. Cl.⁵ ................................................. G11B 5/09
[52] U.S. Cl. ...................................... 360/32; 360/33.1; 360/48
[58] Field of Search .................. 360/32, 33.1, 39, 48

[56] References Cited

U.S. PATENT DOCUMENTS

| | | | |
|---|---|---|---|
| 4,862,292 | 8/1989 | Enari et al. | 360/8 |
| 4,887,169 | 12/1989 | Bannai et al. | 360/64 X |
| 4,910,605 | 3/1990 | Sasaki et al. | 360/103 X |
| 4,972,335 | 11/1990 | Furuhata et al. | 360/33.1 X |
| 5,136,437 | 8/1992 | Tabuchi et al. | 360/64 |
| 5,175,630 | 12/1992 | Tabuchi et al. | 360/64 X |

FOREIGN PATENT DOCUMENTS

0417609A2 9/1990 European Pat. Off. .

OTHER PUBLICATIONS

"An Experimental Study for a Home-Use Digital VTR", Yamamitsu et al., IEEE Transactions on Consumer Electronics, vol. 35, No. 3, Aug. 1989, pp. 450-457.

Primary Examiner—David Mis
Attorney, Agent, or Firm—Wenderoth, Lind & Ponack

[57] ABSTRACT

For recording video signals of different TV systems in the same track format, effective pixels corresponding to the data of one frame of each TV system video signal are divided into segments of a multiple of 27 and a one frame data component of each segment is compressed to an equal size. Accordingly, the video signal is recorded in the format of 27 segments per track.

7 Claims, 3 Drawing Sheets

METHOD OF RECORDING A DIGITAL VIDEO SIGNAL

BACKGROUND OF THE INVENTION

1. Field of the Invention

The present invention relates to a method of recording a digital video signal.

2. Description of the Prior Art

A variety of video signals are now available for use with not only the existing NTSC (60 Hz), PA-L (50 Hz), and SECAM (50 Hz) systems but also advanced High Definition television (HDTV) systems (50/60 Hz) including the MUSE system (60 Hz) of a frequency bandwidth compression type and the HD-MAC system (50 Hz). In particular, a video signal in digital form is more preferred and for recording such a digital video signal, a digital VTR (video tape recorder) has been developed. For example, a known digital VTR for use in broadcasting service employs the D-1 method for recording two different TV signals in one common format (See SMPTE 224M: "Proposed American National standard for component digital video recording 19-mm type D-1 cassette-tape record").

The D-1 method is designed for recording of video signals of two different TV systems; one, like NTSC, provides 525 lines for one frame scanned at a rate of about 30 frames per second (referred to as a 525-line system hereinafter) and the other, like PAL or SECAM, provides 625 lines for one frame scanned at about 25 frames per second (referred to as a 625-line system hereinafter) one frame consists of two fields and in the D-1 method, data is recorded in each field. Hence, the number of fields per second is about 60 in the 525-line system and about 50 in the 625-line system. Also, the total of effective pixels per field for a luminance component of the video signal is expressed as 720 columns by 250 rows in the 525-line system and 720 columns by 300 rows in the 625-line system. As understood, both the 525-line and 625-line systems are almost equal in the number of effective pixels for each second (fields x horizontal pixels x vertical pixels). In the D-1 method, the effective pixels for one field are grouped into 10×300 segments of the 525-line system and 12×300 segments of the 625-line system so that each segment can contain an equal number of pixels. 300 of the segments are then recorded onto each track of a recording tape.

Two major disadvantages of the above D-1 method will now be explained.

(1) Although the effective pixels of the 525-line system are aligned in 250 lines, actual image data of the video signal occupy 242 lines. Also, 288 lines of the 625-line system, other than 300 lines, are filled with actual image data of the video signal. The D-1 method provides a surplus of effective pixels in the vertical direction for the purpose of setting the number of segments per track to 300. As the result, more than a desired data has to be recorded and the consumption of a recording tape will be increased. If such a redundant data is recorded onto a cassette tape, the cassette tape of considerable size is needed. However, a smaller size of the cassette tape is preferred for use with a home VTR than that of a broadcasting system VTR using the D-1 method.

(2) The D-1 method provides the foregoing format for recording two different video signals of the existing TV systems and fails to work with any HDTV system which will soon be in service.

SUMMARY OF THE INVENTION

The present invention is directed towards an improved method of recording a digital video signal in which a video signal of a HDTV system as well as any of the existing TV system can be recorded using a common format. The recording method of the present invention permits a recording tape to be less consumed by recording only corresponding data to the effective pixels.

A method of recording a digital video signal according to the present invention, in which digital video signals of two or more of different TV systems are recorded in the common format onto recording tracks of a recording medium, comprises the steps of for recording the data of one frame of an input digital video signal, dividing effective pixels corresponding to the one frame data into segments of a multiple of 27, compressing the data rate of a digital video signal component of each segment to a given range, and recording the compressed digital video signal in the format of 27 segments per track.

For recording a digital video signal of the 525-line system, a luminance signal component of the one frame data of the digital video signal is allocated to an array of effective pixels having 720 pixels in each horizontal row and 480 pixels in each vertical column and the one frame data is divided into 27×10 segments and thus, recorded onto 10 tracks of the recording medium.

For recording a digital video signal of the 625-line system, a luminance signal component of the one frame data of the digital video signal is allocated to an array of effective pixels having 720 pixels in each horizontal row and 576 pixels in each vertical column and the one frame data is divided into 27×12 segments and thus, recorded onto 12 tracks of the recording medium.

For recording a digital video signal of the MUSE system (a Japanese bandwidth-compression type HDTV system), a luminance signal component of the one frame data of the digital video signal is allocated to an array of effective pixels having 384 pixels in each horizontal row and 1056 pixels in each vertical column and the one frame data is divided into 27×20 segments and thus, recorded onto 20 tracks of the recording medium.

For recording a digital video signal of the HD-MAC system (an European bandwidth-compression type HDTV system), a luminance signal component of the one frame data of the digital video signal is allocated to an array of effective pixels having 720 pixels in each horizontal row and 576 pixels in each vertical column and the one frame data is divided into 27×24 segments and thus, recorded onto 24 tracks of the recording medium.

For recording a digital video signal of the High-Vision system (a Japanese HDTV system), a luminance signal component of the one frame data of the digital video signal is allocated to an array of effective pixels having 1152 pixels in each horizontal row and 1080 pixels in each vertical column and the one frame data is divided into 27×20 segments and thus, recorded onto 20 tracks of the recording medium.

For recording a digital video signal of the known European HDTV system, a luminance signal component of the one frame data of the digital video signal is allocated to an array of effective pixels having 1152 pixels in each horizontal row and 1152 pixels in each vertical column and the one frame data is divided into 27×24 segments and thus, recorded onto 24 tracks of the recording medium.

DESCRIPTION OF THE PREFERRED EMBODIMENT

Figure 1:
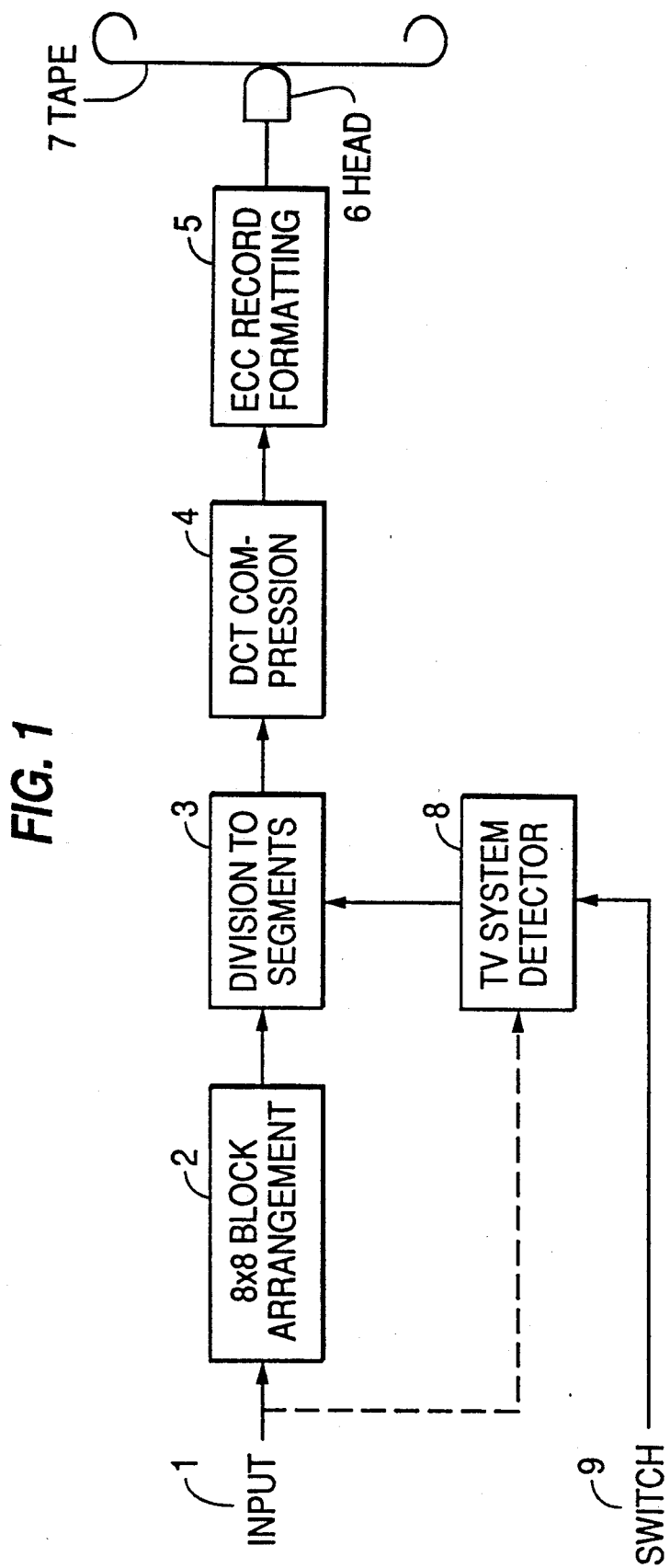
FIG. 1 is a block diagram of a digital VTR employing a method of recording a digital video signal of the present invention.

One preferred embodiment of the present invention will be described referring to the accompanying drawings. FIG. 1 is a block diagram of a digital VTR employing a method of recording a digital video signal of the present invention. Illustrated in FIG. 1 are an input port 1, a 8×8 block arranging unit 2, a segment dividing unit 3, a DCT (discrete cosine transform) compressing unit 4, an ECC (error correction code) record formatting unit 5, a magnetic head 6, a magnetic recording tape 7, a TV system detecting unit 8, and a TV system selector switch 9.

The operation of the arrangement shown in FIG. 1 will now be explained. A digital video signal supplied through the input port 1 is divided into a plurality of 8×8 blocks, each 8×8 block consisting of a matrix of 64 pixels: 8 horizontal pixel rows and 8 vertical pixel columns.

Figure 2:
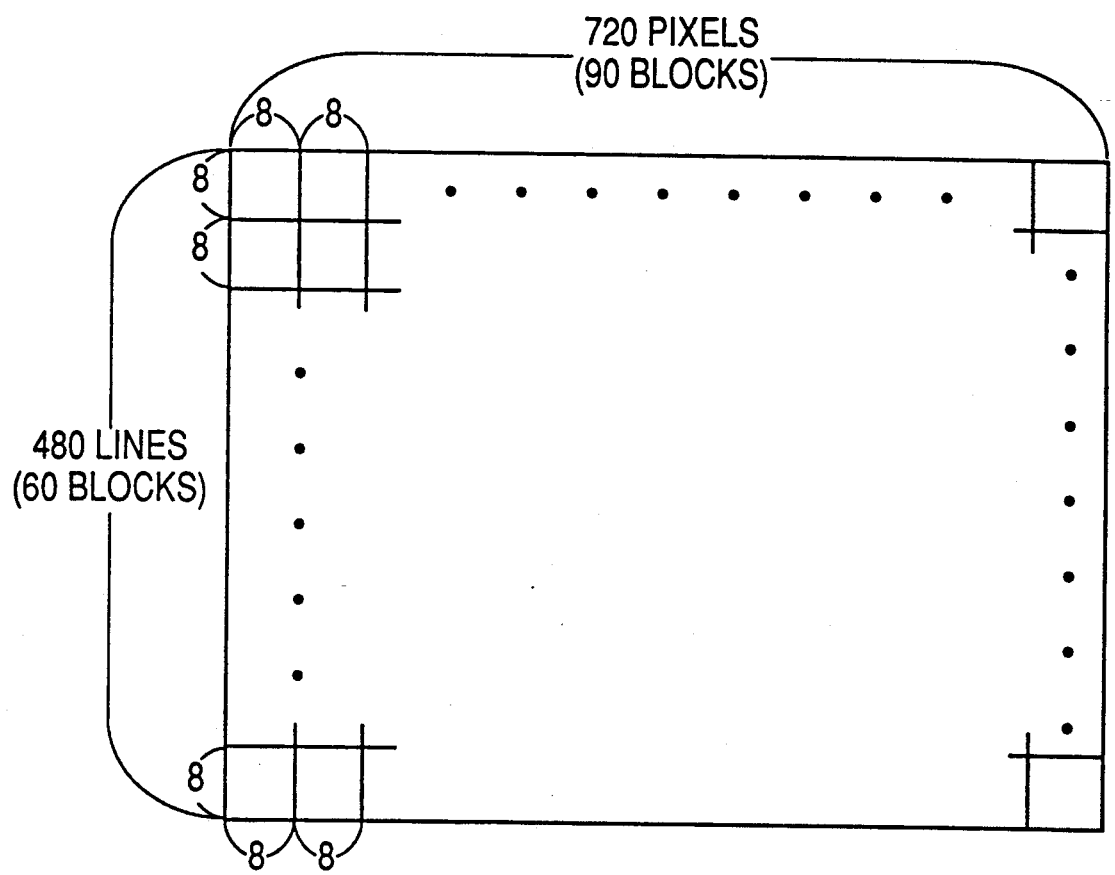
FIG. 2 is an explanatory view of the assignment of blocks according to the present invention.

FIG. 2 illustrates an arrangement of the 8×8 blocks of the 525-line system in which the number of effective lines per frame is 480 and the number of effective pixels per line is 720. More specifically, FIG. 2 represents the luminance signal component of a single picture in the 525 system. As apparent, the picture is divided into a multiplicity of 8×8 blocks; 90 blocks in horizontal (=720/8) and 60 blocks in vertical (=480/8). Hence, the luminance signal for a picture is allocated to 90×60=5400 blocks.

The input signal allocated to the 8×8 blocks is now divided into segments by the segment dividing unit 3, shown in FIG. 1, which is triggered by an instruction signal supplied from the TV system detecting unit 8 and indicating the type of a TV system associated with the input signal. The TV system detecting unit 8 can manually be controlled by the switch 9 to select a desired TV system to be used. Also, the current TV system in action may automatically be identified by detecting the number of lines per frame in a digital video input signal or by another appropriate manner.

The division of the input signal to segments is commonly executed by temporarily recording the data of the input signal into a RAM which can hold a data of one frame and retrieving a data portion of one segment in the form of 8×8 blocks through the control of output address. In the 525-line system shown in FIG. 2, one segment consists of twenty 8×8 blocks of the luminance signal components and ten 8×8 blocks of the chrominance signal components. Accordingly, the total of thirty 8×8 blocks of the video signal for one segment is read out from the RAM.

Figure 3:
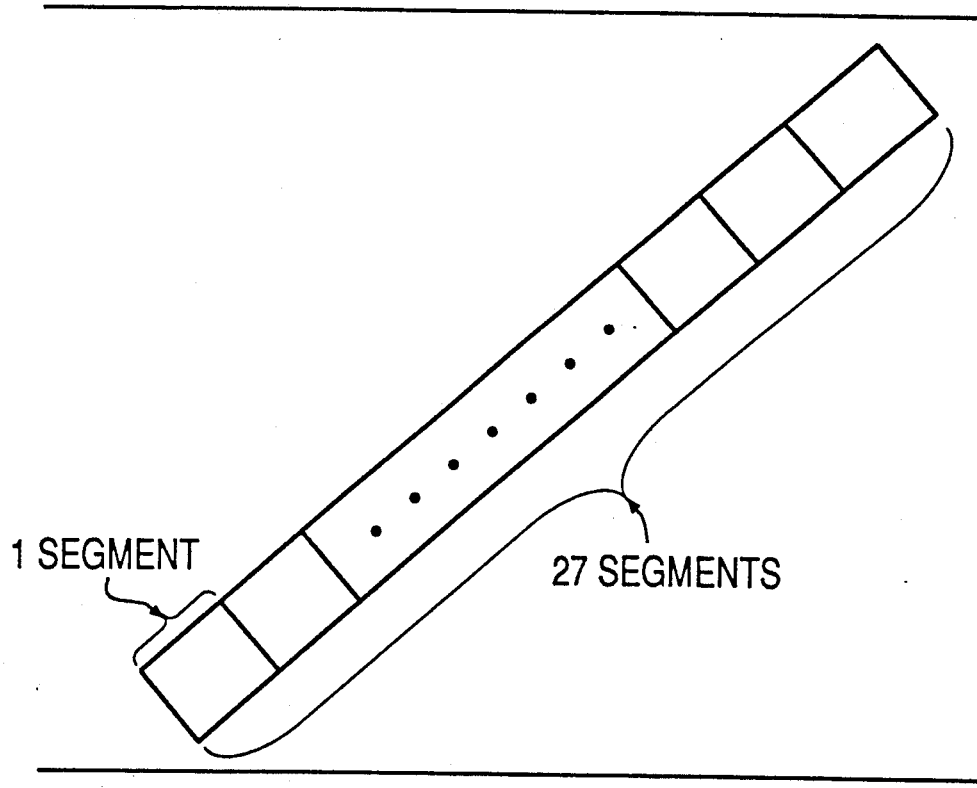
FIG. 3 is an explanatory view of a track format according to the present invention.

Each segment signal is then compressed with the DCT compressing unit 4 by a DCT technique. The DCT technique is a type of orthogonal transformation in which the data of 8×8 blocks is converted to a frequency component for ease of compressing the picture data. The present invention uses the DCT technique for compressing the input signal to a given size of data in each segment. The compressed data of the given size is processed at the ECC record formatting unit 5 by error correction encoding and record formatting and then, recorded onto the magnetic tape 7 with the magnetic head 6. FIG. 3 shows the record format of each track on the magnetic tape 7 which contains 27 segments of the compressed video signal. It is understood that other segments for an audio signal and ECC data can be added to the video signal segments if any. The sequence of the steps of 8×8 block allocation, division into segments, and DCT compression shown in FIG. 1 may be changed depending on the requirements. Also, both the 8×8 block allocation and the division to segments may be executed at one time using a single RAM.

The division to segments in a different TV system will now be described. Using the foregoing arrangement, six different video signals of discrete TV systems including the existing TV systems and some HDTV systems can be recorded. The input video signal of one frame data is divided into segments of a multiple of 27 and recorded in a format of 27 segments per track. Table 1 indicates the division to segments in six different TV systems: the existing 525-line and 625-line systems, the MUSE and HD-MAC systems of band compression HDTV type, the 1125-line system (a Japanese HDTV system with 1125 scanning lines per frame), and the 1250-line system (an European HDTV system with 1250 scanning lines per frame).

Table 1 displays the number of effective pixels for luminance and chrominance components of a one-frame video signal and the number of effective lines for the same. Also, the number of tracks to be used for recording of the one-frame signal and the number of 8×8 blocks in each segment are denoted.

The number of 8×8 blocks per segment is calculated from:

(The number of effective lines)×(the number of effective pixels)/(the number of tracks per frame)/8×8/27. The number of the 8×8 blocks per segment shown in Table 1 is a sum of the luminance signal blocks and the chrominance signal blocks. The number of the 8×8 blocks per segment in each TV system is determined in this manner. In particular, the MUSE system produces a fragmental part of the block number in a segment which may be utilized for recording a control signal or the like. It is now apparent that the data of one segment of each TV system is compressed into an equal size and thus, can be recorded by the same procedure. Table 1 shows the compression of the data of each segment into a 3072-bit form which is realized with the use of a particular compression ratio depending on the TV system. As understood, various video signals of their respective TV systems can be uniform in the number of segments per track and the data of each segment by means of controlling the rate of compression in the procedure of frequency band compression.

TABLE 1

| TV system | Effective pixels per line Luma/Chroma | Effective lines per frame Luma/Chroma | Tracks per frame | 8 × 8 blocks per segment | Ratio of compression |
| --- | --- | --- | --- | --- | --- |
| 525 | 720/180 | 480/480 | 10 | 30 | 1/5 |
| 625 | 720/360 | 576/288 | 12 | 30 | 1/5 |
| MUSE | 384/96 | 1056/528 | 20 | 15 | 1/2.5 |
| HD-MAC | 720/360 | 576/288 | 24 | 15 | 1/2.5 |
| 1125 | 1152/288 | 1080/540 | 20 | 45 | 1/7.5 |
| 1250 | 1152/288 | 1152/576 | 24 | 40 | 1/6.67 |

Each of the above segments contains a basic unit of the video signal data which will in real operation be processed by both the error correction encoding and the record formating prior to recording onto a magnetic tape. Accordingly, the segment may further be divided into smaller segments if desired.

According to the foregoing arrangement of the embodiment, the number of segments in common and the data of each segment after data compression are determined to a given value and a uniform size respectively so that a common method of recording a video signal can be provided for the different TV systems. Hence, a novel digital VTR capable of recording different video signals of their respective TV systems will be developed. Also, this recording method of the present invention is applicable to a new HDTV system which will be introduced in the near future.

The method of recording a digital video signal according to the present invention is not limited to the foregoing description and will with equal success be used in the transmission of data of different TV signals. The number of effective pixels, the number of effective lines, the number of tracks per frame, the number of segments, and the ratio between luminance and chrominance components assigned in the embodiment are illustrative and will be varied to desired values. In addition, the six different TV systems described above are selected only for ease of description. The procedure of data rate compression will be carried out by any known method and simultaneously, a signal which requires no data rate compression may be accepted.

What is claimed is:

1. A method of recording digital video signals of two or more of different TV systems in the common format onto recording tracks of a recording medium, comprising the steps of:

for recording the data of one frame of an input digital video signal, dividing effective pixels corresponding to the one frame data into segments of a multiple of 27;

compressing the data rate of a digital video signal component of each segment to a given range; and recording the compressed digital video signal in the format of 27 segments per track.

2. A method of recording a digital video signal according to claim 1, wherein while a luminance signal component of the one frame data of a TV system to be recorded is allocated to an array of effective pixels having 720 pixels in each horizontal row and 480 pixels in each vertical column, the one frame data is divided into 27×10 segments and thus, recorded onto 10 tracks, 27 segments in each track, of the recording medium.

3. A method of recording a digital video signal according to claim 1, wherein while a luminance signal component of the one frame data of a TV system to be recorded is allocated to an array of effective pixels having 720 pixels in each horizontal row and 576 pixels in each vertical column, the one frame data is divided into 27×12 segments and thus, recorded onto 12 tracks, 27 segments in each track, of the recording medium.

4. A method of recording a digital video signal according to claim 1, wherein while a luminance signal component of the one frame data of a TV system to be recorded is allocated to an array of effective pixels having 384 pixels in each horizontal row and 1056 pixels in each vertical column, the one frame data is divided into 27×20 segments and thus, recorded onto 20 tracks, 27 segments in each track, of the recording medium.

5. A method of recording a digital video signal according to claim 1, wherein while a luminance signal component of the one frame data of a TV system to be recorded is allocated to an array of effective pixels having 720 pixels in each horizontal row and 576 pixels in each vertical column, the one frame data is divided into 27×24 segments and thus, recorded onto 24 tracks, 27 segments in each track, of the recording medium.

6. A method of recording a digital video signal according to claim 1, wherein while a luminance signal component of the one frame data of a TV system to be recorded is allocated to an array of effective pixels having 1152 pixels in each horizontal row and 1080 pixels in each vertical column, the one frame data is divided into 27×20 segments and thus, recorded onto 20 tracks, 27 segments in each track, of the recording medium.

7. A method of recording a digital video signal according to claim 1, wherein while a luminance signal component of the one frame data of a TV system to be recorded is allocated to an array of effective pixels having 1152 pixels in each horizontal row and 1152 pixels in each vertical column, the one frame data is divided into 27×24 segments and thus, recorded onto 24 tracks, 27 segments in each track, of the recording medium.

* * * * *